US008443985B2

(12) United States Patent
Aoyama et al.

(10) Patent No.: US 8,443,985 B2
(45) Date of Patent: May 21, 2013

(54) LIQUID SUPPLYING MEMBER, NEGATIVE PRESSURE UNIT, AND LIQUID DISCHARGING APPARATUS

(75) Inventors: Kazuhiro Aoyama, Yokohama (JP); Manabu Sueoka, Yokohama (JP); Yoshiyuki Kurita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 12/762,552

(22) Filed: Apr. 19, 2010

(65) Prior Publication Data

US 2010/0282342 A1 Nov. 11, 2010

(30) Foreign Application Priority Data

May 8, 2009 (JP) ................................ 2009-113424

(51) Int. Cl.

| | |
|---|---|
| ***B01D 35/28*** | (2006.01) |
| ***B41J 2/015*** | (2006.01) |
| ***B41J 2/135*** | (2006.01) |
| *B01D 35/00* | (2006.01) |
| *B41J 2/19* | (2006.01) |
| *E03B 7/07* | (2006.01) |

(52) U.S. Cl.
USPC ... 210/348; 210/257.1; 210/259; 222/189.06; 222/189.11; 222/251

(58) Field of Classification Search
USPC .............. 210/188, 257.1, 258, 259, 348, 459; 222/189.06, 189.11, 251, 372, 424.5; 347/20, 347/22, 44, 92, 93; 137/544
See application file for complete search history.

(56) References Cited

U.S. PATENT DOCUMENTS 4,368,478 A * 1/1983 Koto .............................. 347/86
6,848,776 B2 2/2005 Nishioka et al.
7,273,275 B2 * 9/2007 Buchanan et al. .............. 347/87
2005/0062818 A1 3/2005 Hashi et al.

* cited by examiner

*Primary Examiner* — Duane Smith
*Assistant Examiner* — Madeline Gonzalez
(74) *Attorney, Agent, or Firm* — Fitzpatrick, Cella, Harper & Scinto

(57) ABSTRACT

A deposition of bubbles or foams to an inner wall of a liquid supplying member is prevented, thereby improving ejecting performance of the bubbles or foams. In the liquid supplying member which forms a flow path for supplying a liquid to a liquid discharging apparatus, the inner wall surface has a concave/convex shape in which a mountain portion and a valley portion are repeated at a predetermined spatial frequency. Assuming that an opening diameter of a filter provided for the liquid discharging apparatus is equal to R (μm), one period f (μm)of the spatial frequency lies within a range from R or more to $\sqrt{2}\cdot R$ or less and a maximum height Ry (μm) of the mountain portion is equal to $\sqrt{2}\cdot R/2$ or more.

8 Claims, 3 Drawing Sheets

LIQUID SUPPLYING MEMBER, NEGATIVE PRESSURE UNIT, AND LIQUID DISCHARGING APPARATUS

BACKGROUND OF THE INVENTION

1. Field of the Invention

The present invention relates to a liquid supplying member, a negative pressure unit, and a liquid discharging apparatus.

2. Description of the Related Art

In a liquid discharging apparatus such as an ink jet recording apparatus, when bubbles are mixed into a liquid such as ink, the discharge becomes unstable or a discharge amount fluctuates. If bubbles exist in a tank for storing the ink, a flow path for supplying the ink stored in the tank to a liquid discharging head, or the like, the liquid is not smoothly supplied or circulated.

In recent years, the ink jet recording apparatus is also used when an image or characters are recorded onto a sheet of a large size such as A1 format or A0 format.

In the ink jet recording apparatus which consumes a large amount of ink as mentioned above, a main tank and the liquid discharging head (recording head) are connected through the negative pressure unit. The ink in the main tank is supplied to the recording head through the negative pressure unit as necessary and the ink in the recording head is collected to the negative pressure unit.

The negative pressure unit has: a buffer function for temporarily storing the ink which is supplied to the recording head; and a gas/liquid exchanging function for separating the bubbles or foams mixed through the recording head or tube into the ink (liquid) and the gas. A lower space in the negative pressure unit is used mainly to perform the buffer function. An upper space in the negative pressure unit is used mainly to perform the gas/liquid exchanging function.

The gas is often mixed into the recording head in the case of executing a head recovery in order to remove the mist and ink deposited onto the nozzle surface after a predetermined recording was executed. Particularly, when a series of recovering steps due to the ink suction is executed, there is a case where the air is mixed from the nozzle, so that the air remains in the recording head or the tube (ink flow path) or becomes bubbles and flows.

If air stagnation exists on the nozzle side of a filter on the ejecting side arranged in the recording head, the air passes through the filter and flows to the negative pressure unit side in association with the ink sucking operation by a pump.

If the bubbles remain or are deposited in the ink flow path or the negative pressure unit, the smooth flow of the ink is obstructed and becomes a cause of an increase in drain ink amount at the time of the recovery operation or becomes a cause of occurrence of a trouble in the separation into the liquid and the gas in a gas/liquid exchanging chamber.

An ink tank which has a main ink chamber and a sub-ink chamber and in which the inside of the sub-ink chamber is partitioned to a bubble storage part and an ink storing portion by a partition plate has been disclosed in U.S. Pat. No. 6,848,776. Further, an ink introducing hole to introduce the ink from the bubble storage part to the ink storing portion is formed in the partition plate, and a concave/convex surface is formed on the surface which faces the bubble storage part. In the ink tank having the above structure, the bubbles generated in the bubble storage part are captured by the concave/convex surface and the captured bubbles are coupled and increase in size, so that they are separated from the ink liquid surface and ejected.

However, in the ink tank disclosed in U.S. Pat. No. 6,848,776, shapes and materials of the portions near the ink introducing hole and those of the inner wall of the tank are not the shapes and materials which are effective to separate and eject the bubbles. There is, consequently, a case where the bubbles are deposited in the tank and it becomes difficult to eject them. Therefore, in the case where a portion to be detected (prism) for optically detecting a residual amount of ink in the sub-ink chamber is arranged under the ink introducing hole, there is a possibility that an erroneous detection is caused by the bubbles deposited to the portions near the ink introducing hole or by the grown foams.

SUMMARY OF THE INVENTION

It is an object of the invention to provide a liquid supplying member which can prevent deposition of bubbles and foams onto an inner wall of the liquid supplying member and can improve ejecting performance of the bubbles and foams.

Another object of the invention is to provide a liquid supplying member for supplying a liquid to a liquid discharging apparatus, comprising: a filter which is provided at an inlet of the liquid supplying member; and a concave/convex shape which is provided on an inner wall surface of the liquid supplying member and in which a mountain portion and a valley portion are repeated, wherein assuming that an opening diameter of the filter is equal to R (μm), one period f (μm) of a spatial frequency at which the mountain portion and the valley portion of the concave/convex shape are repeated lies within a range from R or more $\sqrt{2}\cdot R$ or less and a maximum height Ry (μm) of the mountain portion is equal to $\sqrt{2}\cdot R/2$ or more.

Further features of the present invention will become apparent from the following description of exemplary embodiments with reference to the attached drawings.

DESCRIPTION OF THE EMBODIMENTS

Figure 1:
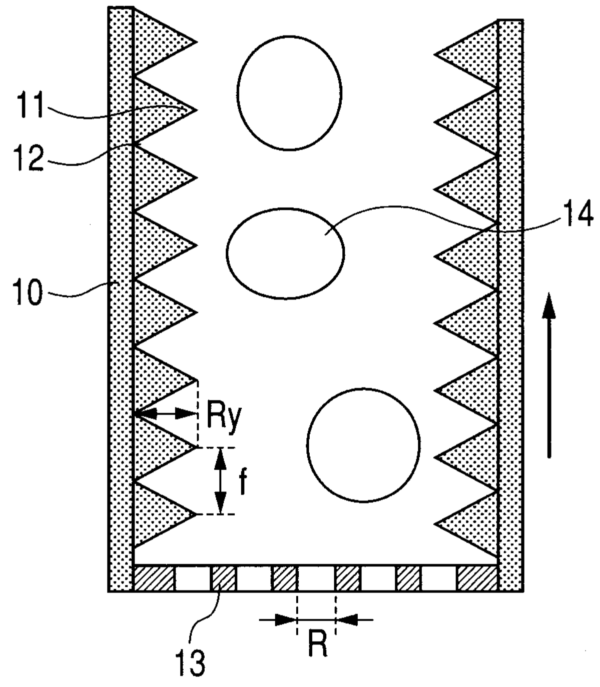
FIG. 1 is a partial enlarged cross sectional view illustrating an example of an embodiment of a liquid supplying member of the invention.

An example of an exemplary embodiment of a liquid supplying member of the invention will be described with reference to the drawings. FIG. 1 is a partial enlarged cross sectional view of an example of a liquid supplying member 10 according to the embodiment.

As illustrated in FIG. 1, the inner wall surface of the liquid supplying member 10 has a concave/convex shape in which a mountain portion 11 and a valley portion 12 are repeated along a flowing direction (direction shown by an arrow in the diagram) of a liquid at a predetermined spatial frequency. A filter 13 is provided at one end of the liquid supplying member 10 in order to remove a foreign matter such as dust. That is, the filter 13 is provided at an inlet of the liquid supplying member 10. Therefore, if air stagnation exists under the filter 13, bubbles 14 are generated through the filter 13 by the flow of the liquid and are floated and flow in the liquid. That is, if air stagnation exists in the upstream of the filter 13 with respect to the flowing direction of the liquid, the bubbles 14 are generated through the filter 13 by the movement of the liquid and are floated and flow in the liquid.

Subsequently, a structure (shape) of the inner wall surface of the liquid supplying member 10 will be described further in detail. Assuming that an opening diameter of the filter 13 is equal to R (μm), the mountain portion 11 and the valley portion 12 are periodically and repetitively formed on the inner wall surface of the liquid supplying member 10 at a spatial frequency in which one period f (μm) lies within a range from R or more to $\sqrt{2}\cdot R$ or less. In other words, a pitch between the centers of the adjacent mountain portions (or valley portions) lies within a range from R (μm) or more to $\sqrt{2}\cdot R$ (μm) or less. Further, a maximum height Ry (μm) of the mountain portion 11 (=maximum depth of the valley portion 12) is equal to $\sqrt{2}\cdot R/2$ (μm) or more.

The liquid supplying member 10 is molded by using a die. The die is worked by a machining center to which an end mill according to the shape of the inner wall surface of the liquid supplying member 10 mentioned above has been attached. When the die is worked, the working is performed by NC controlling the machining center so that the spatial frequency and the maximum height can be obtained.

Figure 2:
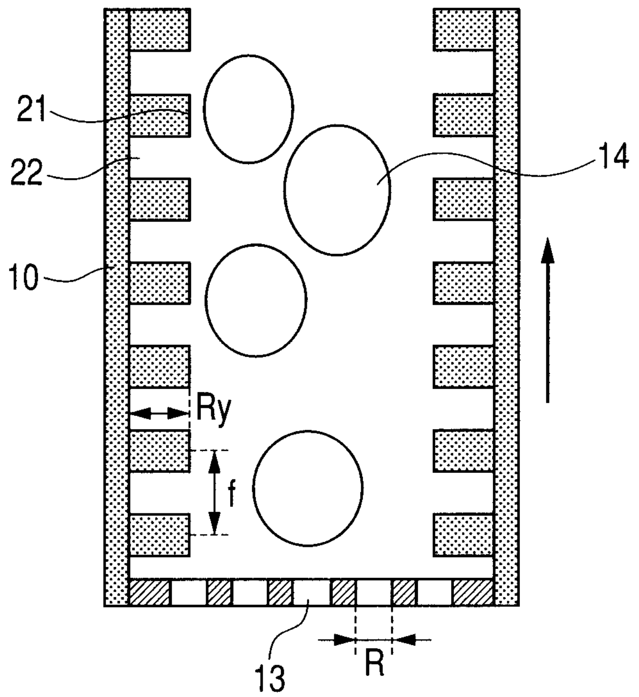
FIG. 2 is a partial enlarged cross sectional view illustrating another example of the embodiment of the liquid supplying member of the invention.

The structure (shape) of the inner wall surface of the liquid supplying member 10 may be a structure (shape) illustrated in FIG. 2. That is, it may be a concave/convex shape in which a convex portion 21 and a concave portion 22 are repeated along the flowing direction of the liquid at a predetermined spatial frequency. Also in the form illustrated in FIG. 2, assuming that an opening diameter of the filter is set to R (μm), the convex portion 21 and the concave portion 22 are periodically repeated at a spatial frequency in which one period f (μm) lies within a range from R or more to $\sqrt{2}\cdot R$ or less. In other words, a pitch between the centers of the adjacent convex portions (or concave portions) lies within a range from R (μm) or more to $\sqrt{2}\cdot R$ (μm) or less. Further, a maximum height Ry (μm) of the convex portion 21 (=maximum depth of the concave portion 22) is equal to $\sqrt{2}\cdot R/2$ (μm) or more.

The die to obtain the comb-tooth like surface shape as illustrated in FIG. 2 is worked by selecting a width of blade so that a desired groove shape can be worked by using a surface grinding machine and by NC controlling the surface grinding machine so as to obtain a desired spatial frequency and the maximum height. The die may be worked by the machining center to which the end mill has been attached.

In any of the above cases, whether or not the die surface has a desired shape is evaluated by using a 3-dimensional shape measuring apparatus using an optical method or by a stylus tracing type measuring apparatus. A spatial frequency analysis of a periodic structure is made from data of a measured roughness curve. As a frequency analysis, a power spectrum analyzing method using Fast Fourier transform (FFT) or a correlation function analyzing method can be used. A numerical value of the maximum height Ry (μm) is obtained based on the definition of JIS B 0601-1994.

Figure 3:
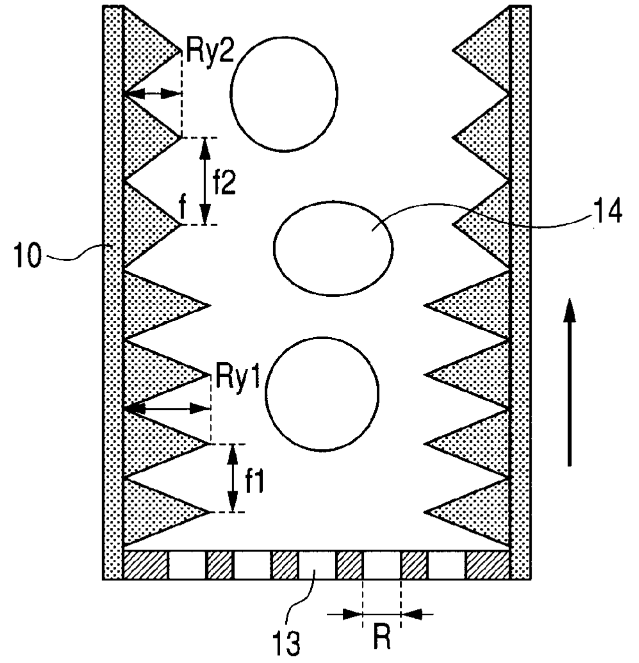
FIG. 3 is a partial enlarged cross sectional view illustrating still another example of the embodiment of the liquid supplying member of the invention.

By the die which was manufactured and evaluated as mentioned above, the liquid supplying member 10 is molded by using an engineering plastics material. The inner wall surface of the liquid supplying member 10 has a concave/convex shape and is worked into a shape having the spatial frequency in the direction parallel with the flowing direction of the liquid or bubbles 14. Specifically speaking, the inner wall surface is worked so as to have the spatial frequency in which one period f (μm) lies within a range from R or more to $\sqrt{2}\cdot R$ or less assuming that the opening diameter of the filter 13 arranged in the liquid supplying member 10 is equal to R (μm) and to obtain the surface shape in which the maximum height Ry (μm) is equal to $\sqrt{2}\cdot R/2$ or more. The shape of the inner wall surface may be a surface shape of one continuous condition so long as the foregoing conditions are satisfied. It may be a combination of surface shapes of two or more different kinds of conditions as illustrated in FIG. 3. Two kinds of concave/convex shapes in which the spatial frequency and the maximum height are respectively different in the ranges of the above conditions are continuously formed on the inner wall surface of the liquid supplying member 10 illustrated in FIG. 3. The shape of the inner wall surface may be a projecting shape.

Each of the vertex portion of the mountain portion 11 and the bottom portion of the valley portion 12 illustrated in FIG. 1 may be flat. In other words, each of the mountain portion 11 and the valley portion 12 may be a trapezoid.

The engineering plastics material having good moldability and workability can be used as a material of the liquid supplying member 10. Desirably, polyacetal (POM), polyether ether ketone (PEEK), polyether ketone (PEK), a urea resin, an ethylene-vinylalcohol copolymer resin (EVOH), nylon (NY), polybutylene terephthalate (PBT), or the like which does not have a hydrophobic group on the surface can be properly used. General-use plastics such as polyethylene (PE) can be used.

As for the engineering plastics which do not have a hydrophobic group on the surface, when the bubbles or foams are come into contact with the surface, since the engineering plastics do not have a hydrophobic interaction with a surface active agent which has been impregnated in the liquid such as ink and oriented on the surfaces of the bubbles or foams, the bubbles or foams are chemically difficult to be deposited.

With respect to the shape of the inner wall surface of the molded and worked liquid supplying member 10, a measurement is made in a manner similar to the die surface, a spatial frequency analysis is performed from data of the measured roughness curve, and the shape is evaluated.

Upon verification of the deposition preventing effect of the bubbles in the liquid supplying member 10 and upon evaluation of the ejecting performance of the bubbles, a transparent window is formed in a part of the liquid supplying member 10 so that the inner wall surface can be observed, and an observation evaluation is performed.

Subsequently, an exemplary embodiment of a liquid discharging apparatus of the invention will be described. The liquid discharging apparatus according to the embodiment is an ink jet recording apparatus having the negative pressure unit.

Figure 4:
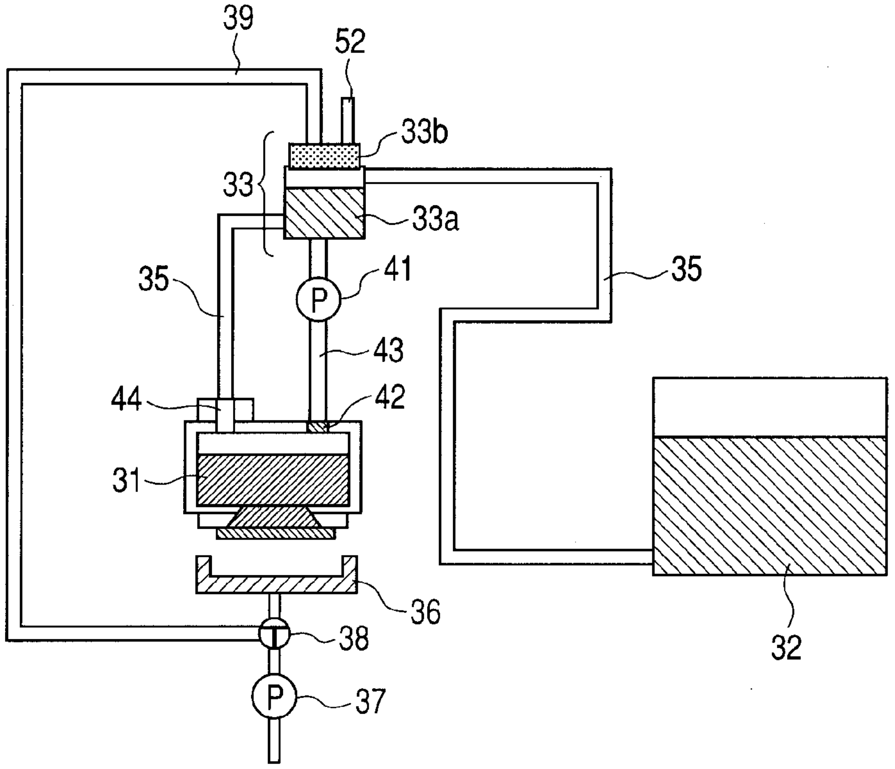
FIG. 4 is a schematic diagram illustrating an example of an embodiment of a liquid discharging apparatus of the invention.

FIG. 4 is a schematic diagram illustrating an ink supplying/circulating system of the ink jet recording apparatus according to the embodiment.

In FIG. 4, a plurality of heating elements (not shown) each for heating the ink in a nozzle and a plurality of nozzles each for discharging the ink are provided for a liquid discharging head (recording head 31). When the ink in the nozzle is boiled by the heating element, a bubble is generated in the nozzle and the ink is generated from the nozzle by a pressure associated with growth of the bubble. A recording medium (not shown) which is recorded by the recording head 31 is conveyed to a position which faces the nozzle by a conveying mechanism (not shown).

A main tank 32 and the recording head 31 are connected through a negative pressure unit 33 arranged on the way of a flow path which couples them. The ink in the main tank 32 is supplied to the recording head 31 through the negative pressure unit 33 as necessary. The ink in the recording head 31 is collected to the negative pressure unit 33.

Figure 5:
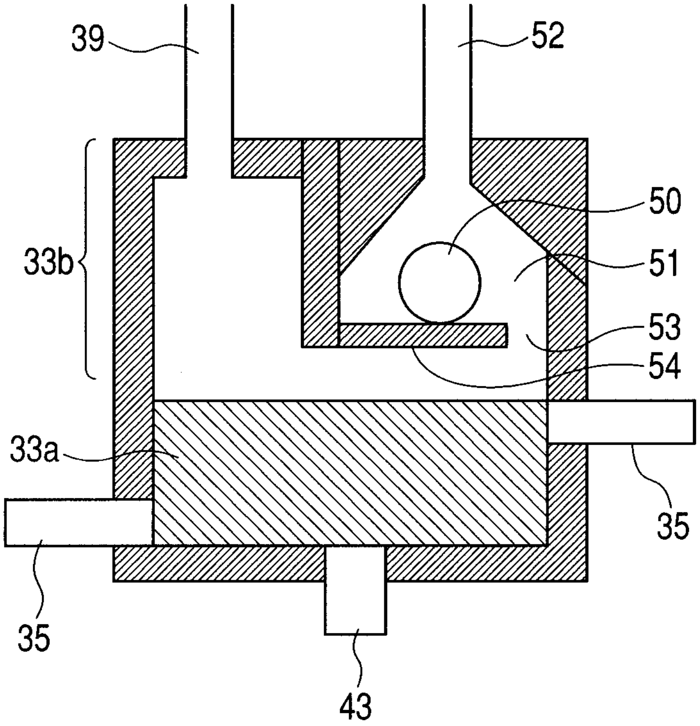
FIG. 5 is a schematic cross sectional view illustrating a structure of a negative pressure unit illustrated in FIG. 4.

An enlarged cross sectional view of the negative pressure unit 33 is illustrated in FIG. 5. The negative pressure unit 33 has: a buffer function for temporarily storing the ink which is supplied to the recording head 31; and a gas/liquid exchanging function for separating the bubbles or foams mixed through the recording head 31 or tube from the ink. A lower space in the negative pressure unit 33 is used mainly to perform the buffer function. An upper space in the negative pressure unit 33 is used mainly to perform the gas/liquid exchanging function. In the following description, there is a case where the lower space in the negative pressure unit 33 which is used mainly to perform the buffer function is called "buffer tank 33*a*" and the upper space in the negative pressure unit 33 which is used mainly to perform the gas/liquid exchanging function is called "gas/liquid exchanging chamber 33*b*", thereby distinguishing them. Naturally, such a distinction is made for convenience of description and, actually, the upper space and the lower space are continuous single space.

Referring again to FIG. 4, the ink stored in the main tank 32 is fed into the buffer tank 33*a* of the negative pressure unit 33, temporarily stored in the buffer tank 33*a*, and thereafter, supplied to the recording head 31. The ink supply from the main tank 32 to the buffer tank 33*a* of the negative pressure unit 33 and the ink supply from the buffer tank 33*a* to the recording head 31 are performed through a flexible supplying tube 35.

A head recovery mechanism is provided for the ink jet recording apparatus of the embodiment in order to maintain and stabilize the discharging performance such as discharge amount and impact position precision of the recording head 31.

According to the head recovery mechanism, the ink is sucked by a sucking pump 37 in a state where the nozzle of the recording head 31 has been covered with a cap 36, thereby eliminating clogging of the nozzle. By using a switching valve 38 illustrated in the diagram, the ink sucked by the sucking pump 37 can be collected to the gas/liquid exchanging chamber 33*b* of the negative pressure unit 33 through a collecting tube 39. By using such an ink path, the ink can be used again and using efficiency of the ink can be improved.

The ink in the recording head 31 is sucked by a circulating pump 41, passes through an ejecting filter 42 provided for the recording head 31, and can be returned to the buffer tank 33*a* through a circulating tube 43.

The ejecting filter 42 is provided for the recording head 31 in order to prevent dust from entering the negative pressure unit 33 by the circulating operation of the ink. Therefore, an opening diameter of the ejecting filter 42 is smaller than an inner diameter of the circulating tube 43. An inflow filter 44 is provided to prevent dust from entering the recording head 31 by the ink supply from the negative pressure unit 33 to the recording head 31. Therefore, an opening diameter of the inflow filter 44 is smaller than the dimensions of a nozzle flow path (not shown) formed in the recording head 31.

Subsequently, the gas/liquid exchanging chamber 33*b* of the negative pressure unit 33 will be described with reference to FIG. 5. A floating member 50 whose specific gravity is smaller than that of the ink and a floating chamber 51 in which the floating member 50 can be moved are provided in the gas/liquid exchanging chamber 33*b*. The bubbles mixed into the ink can be separated into the ink and gas by a gas/liquid separating mechanism comprising the floating member 50 and the floating chamber 51 of the gas/liquid exchanging chamber 33*b*. Since such a mechanism is well-known, its detailed description is omitted here.

The buffer tank 33*a* and gas/liquid exchanging chamber 33*b* constructing the negative pressure unit 33 can be molded by using the die in a manner similar to the liquid supplying member 10. Particularly, a concave/convex shape having a spatial frequency similar to that of the inner wall surface of the liquid supplying member 10 is formed on the inner wall surface of the negative pressure unit 33 so as to be parallel with the flowing direction of the ink to which the air has been mixed.

In the gas/liquid exchanging chamber 33*b*, at the time of the recovery operation of the recording head 31, the ink in which the bubbles have been mixed is returned from the upper portion of the gas/liquid exchanging chamber 33*b* through the collecting tube 39. At this time, although the bubble generated in the recording head 31 passes through the nozzle and flows to the collecting tube 39 by the continuation of the recovery operation, a size of bubble is determined by the opening diameter of the inflow filter 44 without being influenced by the nozzle diameter.

In the floating chamber 51 in the gas/liquid exchanging chamber 33*b*, the ink returned through the collecting tube 39 is gas/liquid separated and the gas is ejected from an ejecting flow path 52 in an upper portion of the floating chamber 51. As mentioned above, in the gas/liquid exchanging chamber 33*b*, the fluid flows in the direction parallel with the inner wall side surface of the gas/liquid exchanging chamber 33*b*. Therefore, in the gas/liquid exchanging chamber 33*b* constructing the negative pressure unit 33, the concave/convex shape having the spatial frequency is formed in the direction parallel with the inner wall side surface.

In the gas/liquid exchanging chamber 33*b*, since the fluid is gas/liquid separated in the floating chamber 51, the ink flows in the direction parallel with the direction which is directed toward an inlet 53 of the floating chamber 51. Therefore, the concave/convex shape having the spatial frequency in the direction parallel with the direction directed toward the inlet 53 of the floating chamber 51 is formed on a bottom surface 54 of the floating chamber 51 on the buffer tank side. That is, assuming that the opening diameter of the filter 44 is set to R (μm), the concave/convex shape which has the spatial frequency in which one period f (μm) lies within a range from R or more to $\sqrt{2}\cdot R$ or less and in which the maximum height Ry (μm) is equal to $\sqrt{2}\cdot R/2$ or more is formed.

In the buffer tank 33*a*, the ink in which the bubbles have been mixed is returned from the recording head through the circulating tube 43. At this time, particularly, the bubbles contained in the ink flow to an upper portion in the direction parallel with the inner wall side surface of the buffer tank 33*a* by a buoyancy. The ink is supplied from the main tank 32 to the buffer tank 33*a*. In this instance, first, the ink flows to a lower portion in the direction parallel with the inner wall side surface of the buffer tank 33*a*. When the ink of a predetermined amount is supplied, the flow of the ink stops. As mentioned above, in the buffer tank 33*a*, the ink flows in the direction parallel with the inner wall side surface in a manner similar to the gas/liquid exchanging chamber 33*b*. Therefore, also in the buffer tank 33*a*, the concave/convex shape having the spatial frequency is formed in the direction parallel with the inner wall side surface. That is, assuming that the opening diameter of the filter 42 is set to R (μm), the concave/convex shape which has the spatial frequency in which one period f (μm) lies within a range from R or more to $\sqrt{2}\cdot R$ or less and in which the maximum height Ry (μm) is equal to $\sqrt{2}\cdot R/2$ or more is formed.

The surface shape of the die to mold the negative pressure unit 33 is evaluated by a method similar to that of the surface shape of the die to mold the liquid supplying member 10. A spatial frequency analysis is performed and the maximum height Ry is obtained also by a method similar to that mentioned above.

The negative pressure unit 33 is molded by using the engineering plastics material by the die which was manufactured and evaluated as mentioned above.

The shape of the inner wall surface of the negative pressure unit 33 may be a surface shape of one continuous condition so long as the foregoing conditions are satisfied. It may be a combination of surface shapes of two or more different kinds of conditions. The shape of the inner wall surface may be a projecting shape.

As a material of the negative pressure unit 33, the engineering plastics material similar to that of the liquid supplying member 10 or a general-use plastics material can be used.

With respect to the shape of the inner wall surface of the negative pressure unit 33, a measurement is made in a manner similar to the die surface, a spatial frequency analysis is performed from data of the measured roughness curve, and the shape is evaluated.

Upon verification of the deposition preventing effect of the bubbles in the negative pressure unit 33 and upon evaluation of the ejecting performance of the bubbles, a transparent window is formed in a part of the negative pressure unit 33 so that the inner wall surface can be observed, and an observation evaluation is performed.

EXAMPLE 1

As an Example of the liquid supplying member 10 illustrated in FIG. 1, 48 kinds of trial products in which the combination of one period f (μm) of the spatial frequency of the inner wall surface shape and the maximum height Ry (μm) differs are manufactured and a depositing state of the bubbles to the inner wall surface is observed with respect to each trial product. With respect to any of the trial products, as a filter 13 illustrated in FIG. 1, the filter having the opening diameter of 15 (μm) is arranged inside of the edge portion. The combination conditions of one period f (μm) of the spatial frequency and the maximum height Ry (μm) in each trial product are as shown in the following Table 1. That is, with respect to one period f (μm) of the spatial frequency, it is made different every 5 (μm) within a range of 5 to 35 (μm). With respect to the maximum height Ry (μm), it is made different every 5 (μm) within a range of 5 to 45 (μm).

Any of the trial products are molded by using the die. The surface of the die which was used (surface on which the inner wall surface of the liquid supplying member is formed) is worked by using the machining center to which the end mill has been attached. Polyacetal (POM) is also used as a material of any of the trial products.

In each trial product, the depositing state to the inner wall surface of the bubbles which pass through the filter and are generated is observed. An observation result is shown in Table 1.

An evaluation reference is defined as follows. The trial product in which the deposition of the bubbles to the inner wall surface is hardly observed is shown by ◎. The trial product in which the depositing state of the bubbles of less than 15% exists in the observation area is shown by ○. The trial product in which the depositing state of the bubbles in a range from 15% or more to less than 30% exists in the observation area is shown by Δ. The trial product in which the depositing state of the bubbles of 30% or more exists in the observation area is shown by x.

TABLE 1

Evaluation of depositing state of the bubbles according to the shape of the inner wall surface

| | | f(μm) | | | | | |
|---|---|---|---|---|---|---|---|
| | | 5-10 | 10-15 | 15-20 | 20-25 | 25-30 | 30-35 |
| Ry | 5-10 | X | X | X | X | X | X |
| (μm) | 10-15 | X | X | ○ | X | X | X |
| | 15-20 | X | X | ◎ | X | X | X |
| | 20-25 | X | X | ◎ | Δ | X | X |
| | 25-30 | X | X | ◎ | Δ | X | X |
| | 30-35 | X | X | ◎ | Δ | X | X |
| | 35-40 | X | X | ◎ | Δ | X | X |
| | 40-45 | X | X | ◎ | Δ | X | X |

It will be understood from Table 1 that in the trial product in which one period f of the spatial frequency is equal to 15 to 20 (μm) and the maximum height Ry is equal to 15 (μm) or more, the deposition of the bubbles is hardly observed and the good deposition preventing performance of the bubbles and the good ejecting performance are obtained.

In the trial product in which one period f of the spatial frequency is equal to 5 to 15 (μm) and the maximum height Ry is equal to 5 (μm) or more, the deposition of a number of bubbles is observed and a state where the bubbles are mutually coupled and foamed with the elapse of time is observed. Further, also in the trial product in which one period f of the spatial frequency is equal to 25 (μm) or more and the maximum height Ry is equal to 5 (μm) or more, the deposition of a number of bubbles is observed and a state where the bubbles are mutually coupled and foamed with the elapse of time is observed.

EXAMPLE 2

As an Example of the negative pressure unit 33 illustrated in FIG. 4, 48 kinds of trial products in which the combination of one period f (μm) of the spatial frequency and the maximum height Ry (μm) differs are manufactured and a depositing state of the bubbles to the inner wall surface is observed with respect to each trial product. The combination conditions of one period f (μm) of the spatial frequency and the maximum height Ry (μm) in each trial product are as shown in Table 1. Any of the trial products is molded by using the die.

Each trial product is built in the ink jet recording apparatus having the construction illustrated in FIG. 4. At this time, as a filter 42 illustrated in FIG. 4, the filter having an opening diameter of 15 (μm) is built in a recording head corresponding to the recording head 31.

In the ink jet recording apparatus in which each trial product has been built, the head recovery operation is executed and the collected ink containing the bubbles is returned to the negative pressure unit (each trial product). Further, when the air existing in the recording head passes through the filter, the bubbles are generated. At this time, although the generated bubbles pass through a pump corresponding to the pump 37 illustrated in FIG. 4, there is hardly a change between the size of bubble before it passes through the pump and that after it passed through the pump, and the bubble size is decided by the opening diameter of the filter. The ink containing the bubbles is also collected to the negative pressure unit by the ink circulation.

The depositing state of the bubbles to the inner wall surface of each trial product is observed. Thus, in the trial product in which one period f of the spatial frequency of the shape of the inner wall surface is equal to 15 to 20 (μm) and the maximum height Ry is equal to 15 (μm) or more, the deposition of the bubbles is hardly observed and the good deposition preventing performance of the bubbles and the good ejecting performance are obtained.

In the trial product in which one period f of the spatial frequency of the shape is equal to 5 to 15 (μm) and the maximum height Ry is equal to 5 (μm) or more and the trial product in which one period f of the spatial frequency of the shape is equal to 25 (μm) or more and the maximum height Ry is equal to 5 (μm) or more, the deposition of a number of bubbles is observed in the buffer tank and the gas/liquid exchanging chamber. In the gas/liquid exchanging chamber, a state where the bubbles are mutually coupled and foamed with the elapse of time is observed.

According to each embodiment of the invention, the deposition of the bubbles or foams to the inner wall of the liquid supplying member is prevented and the ejecting performance of the bubbles or foams is improved. The increase in drain ink amount in the liquid discharging apparatus and the erroneous operation of the separating mechanism of the gas and liquid are prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-113424, filed May 8, 2009, which is hereby incorporated by reference herein in its entirety.

What is claimed is:

1. A recording apparatus comprising:

a recording head configured to discharge an ink;

a negative pressure unit configured to store the ink which is supplied to the recording head and collect the ink which is not discharged from the recording head;

a tube configured to transport the ink from the recording head to the negative pressure unit, wherein (i) an inner wall surface of the tube is made of a material which does not have a hydrophobic group, and (ii) three-dimensional mountain and valley portions are formed on the inner wall surface of the tube, along a moving direction of the ink in a periodically repeated manner at a predetermined spatial frequency; and a filter provided at an end portion on a recording head side of the tube, wherein an opening diameter of the filter is R, and one period of the spatial frequency is within a range from R to $\sqrt{2}\cdot R$ and a minimum height of the mountain portions is equal to or greater than $\sqrt{2}\cdot R/2$.

2. A recording apparatus according to claim 1, wherein the negative pressure unit comprises a buffer tank configured to store the ink, and a gas/liquid exchanging unit configured to separate a gas from the ink collected from the recording head.

3. A recording apparatus according to claim 1, further comprising:

a second tube configured to supply the ink from the negative pressure unit to the recording head.

4. A recording apparatus according to claim 1, further comprising:

a cap configured to cap a discharge surface of the recording head to suck the ink from the recording head; and a third tube configured to transfer the ink sucked by the cap to the negative pressure unit.

5. A recording apparatus comprising:

a recording head configured to discharge an ink;

a negative pressure unit configured to store the ink which is supplied to the recording head and to collect the ink which is not discharged from the recording head, wherein (i) an inner wall surface of the negative pressure unit is made of a material which does not have a hydrophobic group, and (ii) three-dimensional mountain and valley portions are formed on the inner wall surface of the negative pressure unit, along a moving direction of the ink in a periodically repeated manner at a predetermined spatial frequency;

a tube configured to transport the ink from the recording head to the negative pressure unit; and a filter provided at an end portion on a recording head side of the tube, wherein an opening diameter of the filter is R, and one period of the spatial frequency is within a range from R to $\sqrt{2}\cdot R$, and a minimum height of the mountain portions is equal to or greater than $\sqrt{2}\cdot R/2$.

6. A recording apparatus according to claim 5, wherein the negative pressure unit comprises a buffer tank configured to store the ink, and a gas/liquid exchanging unit configured to separate a gas from the ink collected from the recording head.

7. A recording apparatus according to claim 5, further comprising:

a second tube configured to supply the ink from the negative pressure unit to the recording head.

8. A recording apparatus according to claim 5, further comprising:

a cap configured to cap a discharge surface of the recording head to suck the ink from the recording head; and a third tube configured to transfer the ink sucked by the cap to the negative pressure unit.

* * * * *